July 11, 1933.　　　　T. GRISWOLD, JR　　　　1,918,033
APPARATUS FOR THE PRODUCTION OF CARBON DISULPHIDE
Filed Feb. 7, 1927　　　6 Sheets-Sheet 5

INVENTOR.
Thomas Griswold Jr.
BY
Fay, Oberlin & Fay
ATTORNEYS.

July 11, 1933. T. GRISWOLD, JR 1,918,033
APPARATUS FOR THE PRODUCTION OF CARBON DISULPHIDE
Filed Feb. 7, 1927 6 Sheets-Sheet 6

INVENTOR.
Thomas Griswold Jr
BY
Fay, Oberlin & Fay
ATTORNEYS.

Patented July 11, 1933

1,918,033

UNITED STATES PATENT OFFICE

THOMAS GRISWOLD, JR., OF MIDLAND, MICHIGAN, ASSIGNOR TO THE DOW CHEMICAL COMPANY, OF MIDLAND, MICHIGAN, A CORPORATION OF MICHIGAN

APPARATUS FOR THE PRODUCTION OF CARBON DISULPHIDE

Application filed February 7, 1927. Serial No. 166,350.

This invention relates to apparatus for chemical reactions where a mass of solid material and a gasiform substance are to be contacted at elevated temperatures; and it is among the objects of the invention to provide a construction affording chambers of suitable shape for securing effective contact of reacting materials. A further object is to provide efficient heat distribution for such chambers. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail but one of the various ways in which the principle of the invention may be employed.

In said annexed drawings:—

Figure 1:
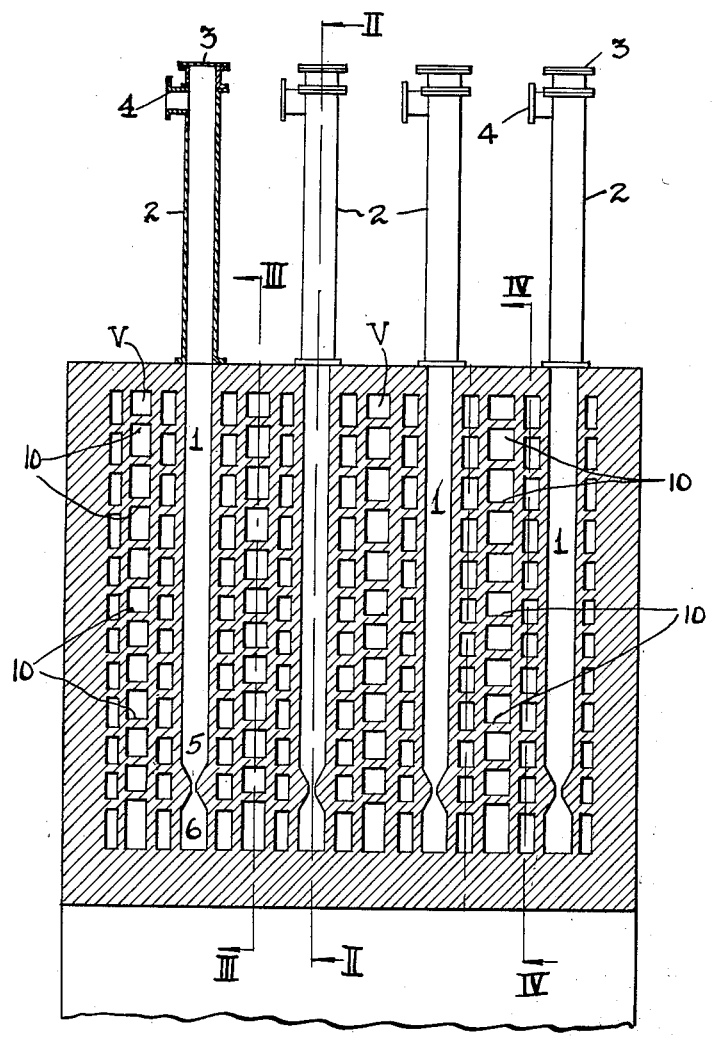
Figure 2:
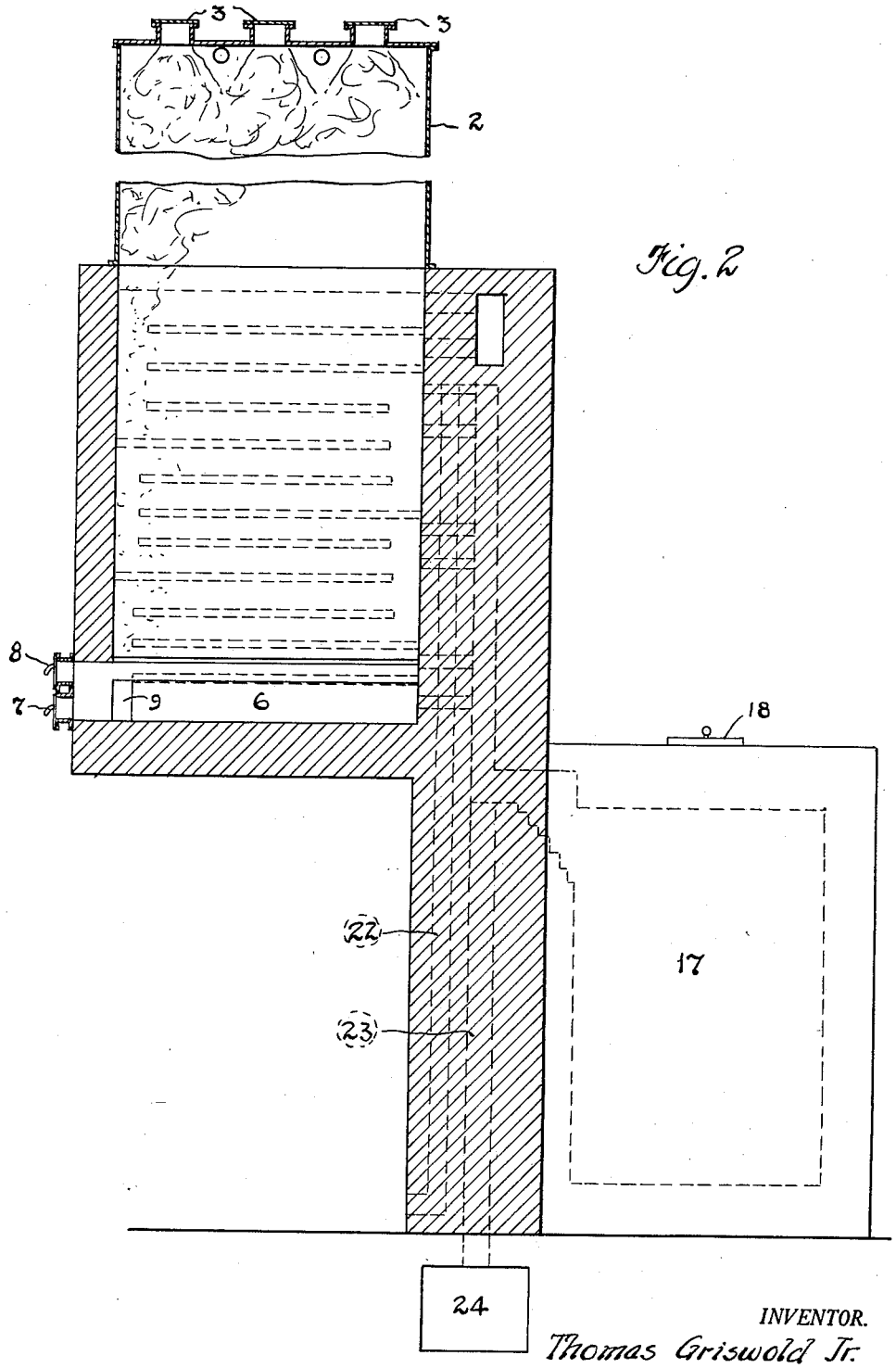
Figure 3:
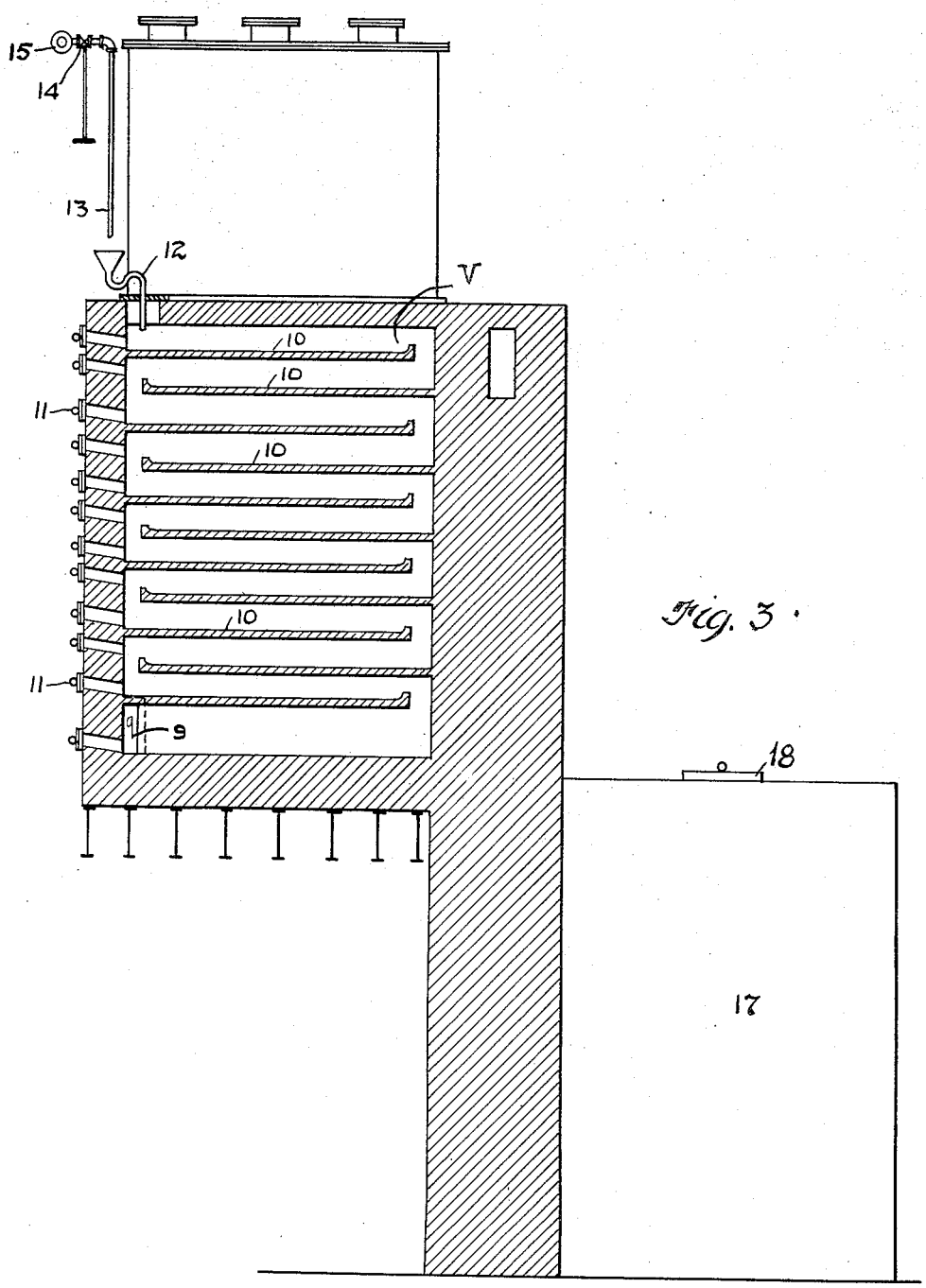
Figure 4:
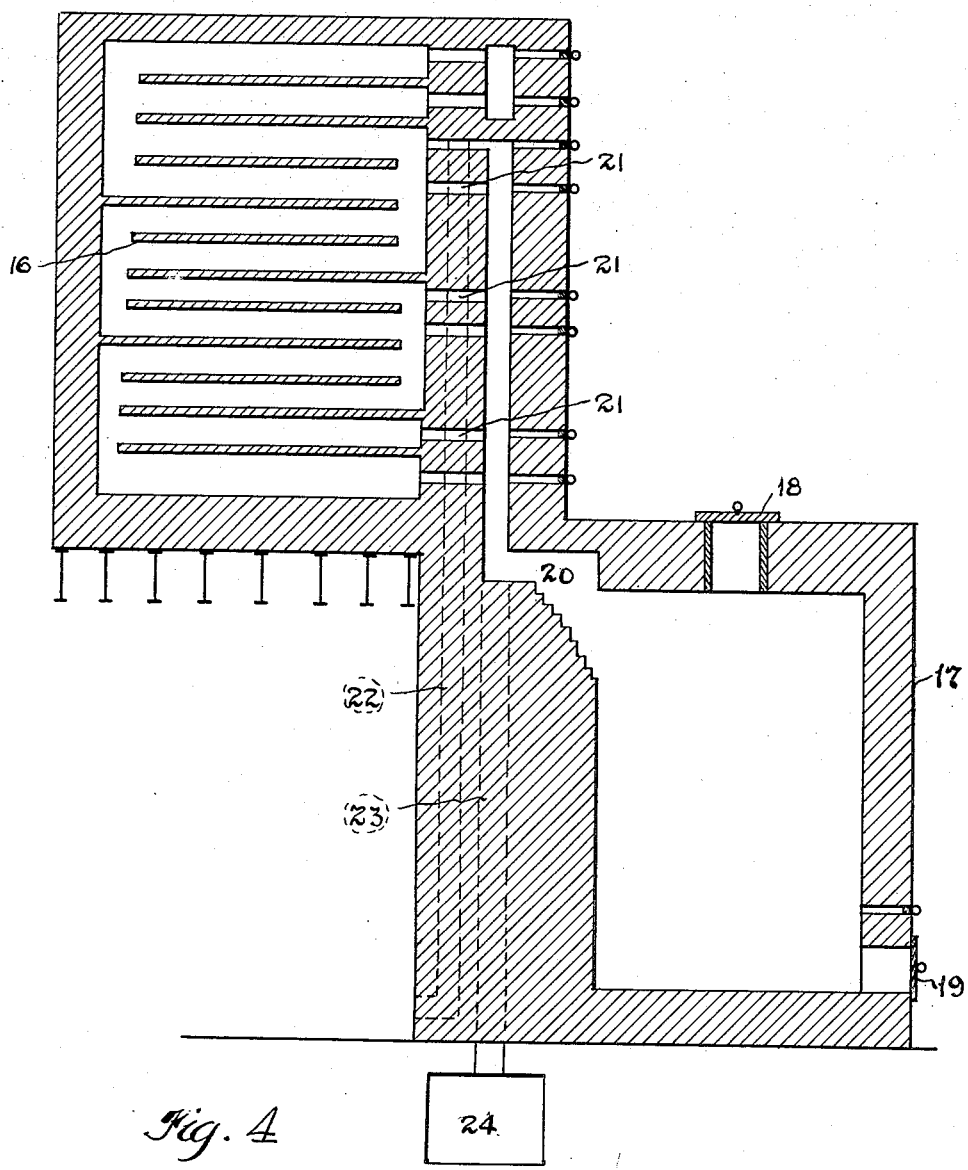
Figure 5:
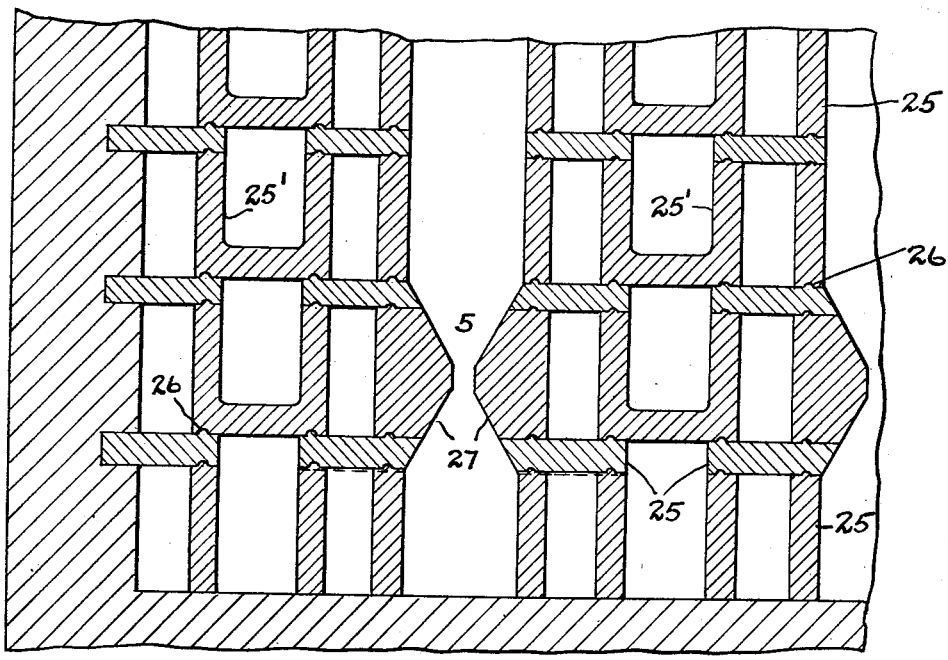
Figure 6:
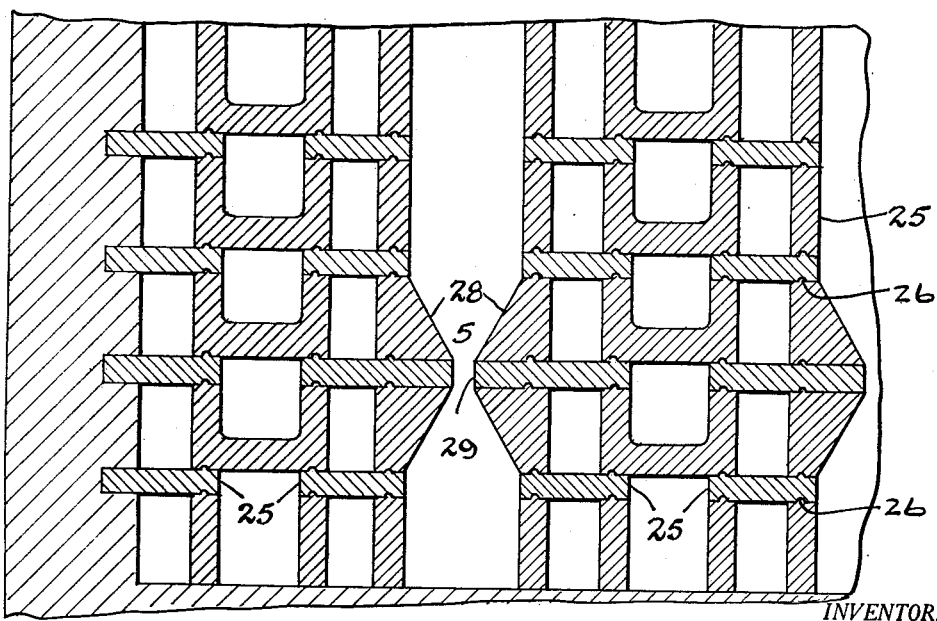
Figure 7:
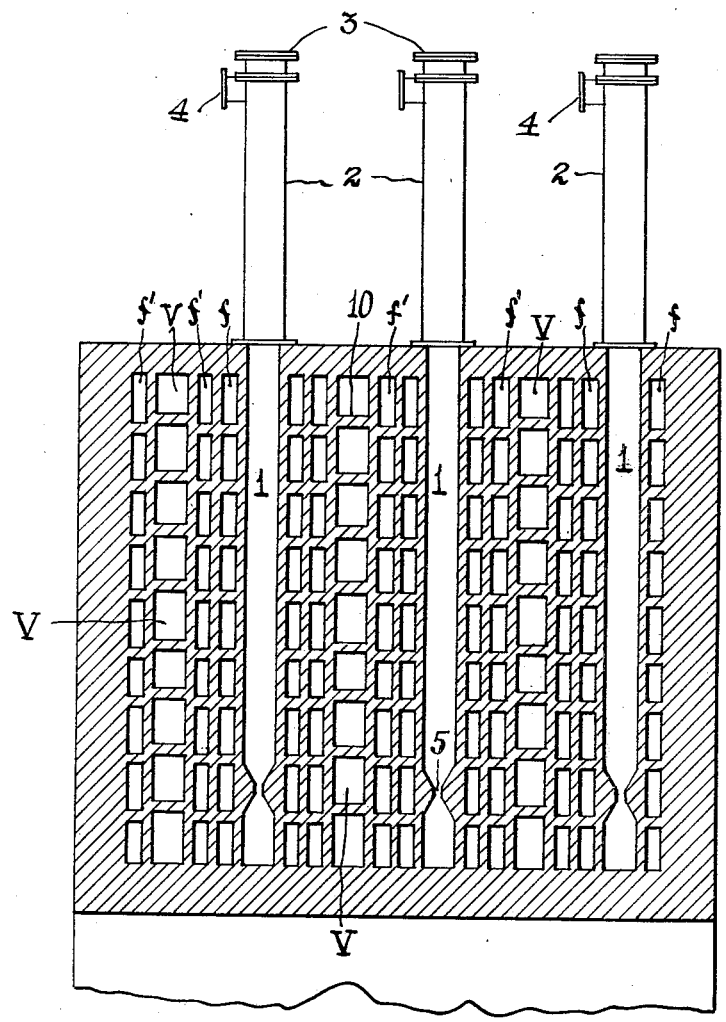

Fig. 1 is a vertical sectional view showing an embodiment of the invention; Fig. 2 is a section taken on a plane indicated by the line II—II, Fig. 1; Fig. 3 is a section taken on a plane indicated by the line III—III, Fig. 1; Fig. 4 is a section taken on a plane indicated by the line IV—IV, Fig. 1; Fig. 5 is a sectional detail on enlarged scale; Fig. 6 is a similar view of a modification; and Fig. 7 is a vertical section of a general modification.

The reference character 1 in the drawings designates a reaction chamber or retort, and surmounting each reaction chamber is a head 2 preferably of separable character and extended to form a supply magazine. At the top are charging ports 3, and off-takes 4 connect to a condenser or absorber system, not shown. At the lower portion of each reaction chamber is a constriction or neck 5, and access is had to the lower or clean-out chamber 6 by a door 7. A rousting-door 8 may also be provided for a purpose to be more particularly referred to hereinafter. Communicating by a cross-port 9 with the retort or reaction chamber is a vaporizer V employing a series of shelves or levels 10 in cascade. Clean-out doors 11 allow access to each shelf, and a trapped inlet 12 serves for the entrance of liquid from the pipe 13 with its controlling valve 14 on the line supply pipe 15.

Heating flues are arranged adjacent the reaction chambers and the vaporizing chambers, there being partitioning-baffles 16. The flue system is in effect interleaved between reaction chambers and vaporizers, and in conjunction with the system is a gas supply generator or producer 17 having a charging port 18 and clean-out 19, the gas from the producer passing by duct 20 to the flues where mixing ports 21 supply air from a duct 22. The latter is associated with the outlet flue 23 for the stack gases on their way to the stack-flue 24, a heat recuperator or regenerator construction being provided.

As a preferred means of construction, I may employ ceramic blocks 25 having mating tongues and grooves 26, these blocks or tiles being laid up to form the walls and outline the respective chambers. As a further convenience, I may employ trough-shaped blocks 25' in the building of the vaporizing chambers, the floors of the troughs being set staggerwise to provide the cascade shelves 10 (Fig. 3). The constriction 5 may be made up by oppositely facing angular blocks 27 (Fig. 5), or baffle blocks 28 set with plate-like blocks 29 may be employed, as preferred. In the construction shown in Fig. 6, the trough members are also shallower, as may be preferable in some instances.

In operation, the solid material is charged in through the magazines 2, and such material may be in the nature of a catalytic or contact mass, or in the nature of a reactant solid. Vapors are provided by the vaporizing chambers, the supply of liquid therefor coming from the line 15 with feed gauged by valve 14 to supply through the trap 12 to the upper level of the vaporizing shelves 10. The liquid progressively vaporizes and superheating may even be had if desired, the vapors thence passing through cross-port 9 to the lower chamber 6 and up through the reaction chamber 1. The gasiform products are taken off at off-takes 4 to the condenser or absorber system. Where carbon disulphide is to be manufactured, and the present construction is especially well adapted for this, sulphur previously melted in a steam-heated melter, for instance, is forwarded by pipe 15 and through the control valve 14 passes down by pipe 13 and trap 12 to the vaporizer. The sulphur is progressively vaporized and if desired may be superheated, and proceeds through the cross-port 9 to the chamber 6 and thence up through the reaction chamber 1 which is filled with carbon usually in the form of charcoal, and maintained at red heat. The carbon disulphide vapors are taken off at off-takes 4 to the condenser system. From time to time as refuse or ash accumulates at the constriction 5 in the reaction chambers, the door 8 may be opened and a rousting tool or hook may be used to clear such ash and thus facilitate access of the sulphur vapor to the charcoal. As the mass of charcoal gradually settles down, replenishing charges may be added through the top ports 3.

In accordance with the present construction, reaction chambers of relatively narrow or flattened section or, as it may be for convenience concisely expressed, of leaf-type, allow of especially efficient heating action, and by conjoining the gas producer or generator in the same general setting, very little heat is lost externally of the system. In such manner, sets of reaction chambers and vaporizing chambers to the number of units desired may be readily erected, the ceramic block or tile construction described making possible a very convenient and effective means to such end.

In some cases it is desirable to independently control the heating of the vaporizers and the heating of the reaction chambers. For this, two sets of distribution flues may be provided, as shown in Fig. 7, one set $f$ adjacent the reaction chamber and another set $f'$ adjacent the vaporizer V. With dampers at the inlet of each flue system in a manner obvious, the amount of heating of the respective units can be separately regulated as desired.

Other modes of applying the principle of the invention may be employed, change being made as regards the details disclosed, provided the means stated by any of the following claims, or the equivalent of such be employed.

I therefore particularly point out and distinctly claim as my invention:—

1. In apparatus of the character described, the combination in a single setting, of a vertically disposed leaf-type reaction chamber having a constricted outlet at the bottom thereof, a cleanout chamber below said reaction chamber and communicating therewith through the constriction such that a charge of charcoal may rest upon such constriction therein, a vertically disposed vaporizing chamber alongside said reaction chamber, heating flues between said reaction chamber and said vaporizing chamber having side walls in common with said chambers, a conduit connection between said vaporizing chamber and said cleanout chamber, a feed inlet to supply molten sulphur to said vaporizing chamber, a magazine to supply charcoal to said reaction chamber, a vapor offtake to lead carbon disulphide vapor from said reaction chamber, and a connection to supply combustible gas to said flues.

2. In apparatus of the character described, the combination in a single setting, of a vertically disposed leaf-type reaction chamber having a constricted outlet at the bottom thereof, a cleanout chamber below said reaction chamber and communicating therewith through the constriction such that a charge of charcoal may rest upon such constriction therein, a vertically disposed vaporizing chamber alongside said reaction chamber, heating flues between said reaction chamber and said vaporizing chamber having side walls in common with said chambers, a conduit connection between said vaporizing chamber and said cleanout chamber, a feed inlet to supply molten sulphur to said vaporizing chamber, a magazine to supply charcoal to said reaction chamber, a vapor offtake to lead carbon disulphide vapor from said reaction chamber, a connection to supply combustible gas to said flues, and means to transfer heat from the products of combustion of said gas to the air supply therefor.

3. Apparatus of the character described, which comprises a plurality of narrow vertically disposed parallel reaction chambers of leaf-type, each said chamber having wall-projections forming a constriction in the lower portion adapted to support a charge of solid material, a clean-out compartment below each such constriction, vaporizer chambers interposed between said reaction chambers, each said vaporizer chamber having a series of levels in cascade adapted to retain thereon a liquid, a flue system for heating said reaction chambers and vaporizers, the entire structure being built in one compact setting, and including a gasifier for supplying a heating gas to said flue system.

4. Apparatus for the production of carbon disulphide, which comprises a series of leaf-type vertically disposed ceramic reaction chambers alternating with a series of heating flues and sulphur vaporizing flues, said heating flues having walls in common with said reaction chambers and vaporizing flues, said reaction chambers having constrictions near the bottoms thereof adapted to retain charges of charcoal thereon and form therebelow ash chambers, means to supply gaseous fuel to said heating flues, and conduits connecting said reaction chambers and vaporizing flues.

5. A carbon disulphide retort setting, comprising a plurality of parallel vertically-disposed leaf-type reaction chambers constricted near the lower portion thereof to support a charge of charcoal, a cleanout chamber below each said reaction chamber and connecting therewith through said constriction, a plurality of vaporizing chambers alternating with said reaction chambers and connecting therewith through said cleanout chambers, a feed inlet to supply molten sulphur to the vaporizing chamber, a magazine to supply charcoal to the reaction chambers, heating flues between said reaction chambers and said vaporizing chambers having side walls in common therewith, a gasifier to supply a combustible gas to said heating flues, and a vapor off-take to withdraw carbon disulphide vapors from said reaction chambers.

Signed by me this 31 day of January, 1927.

THOMAS GRISWOLD, Jr.